United States Patent Office 2,850,121
Patented Sept. 2, 1958

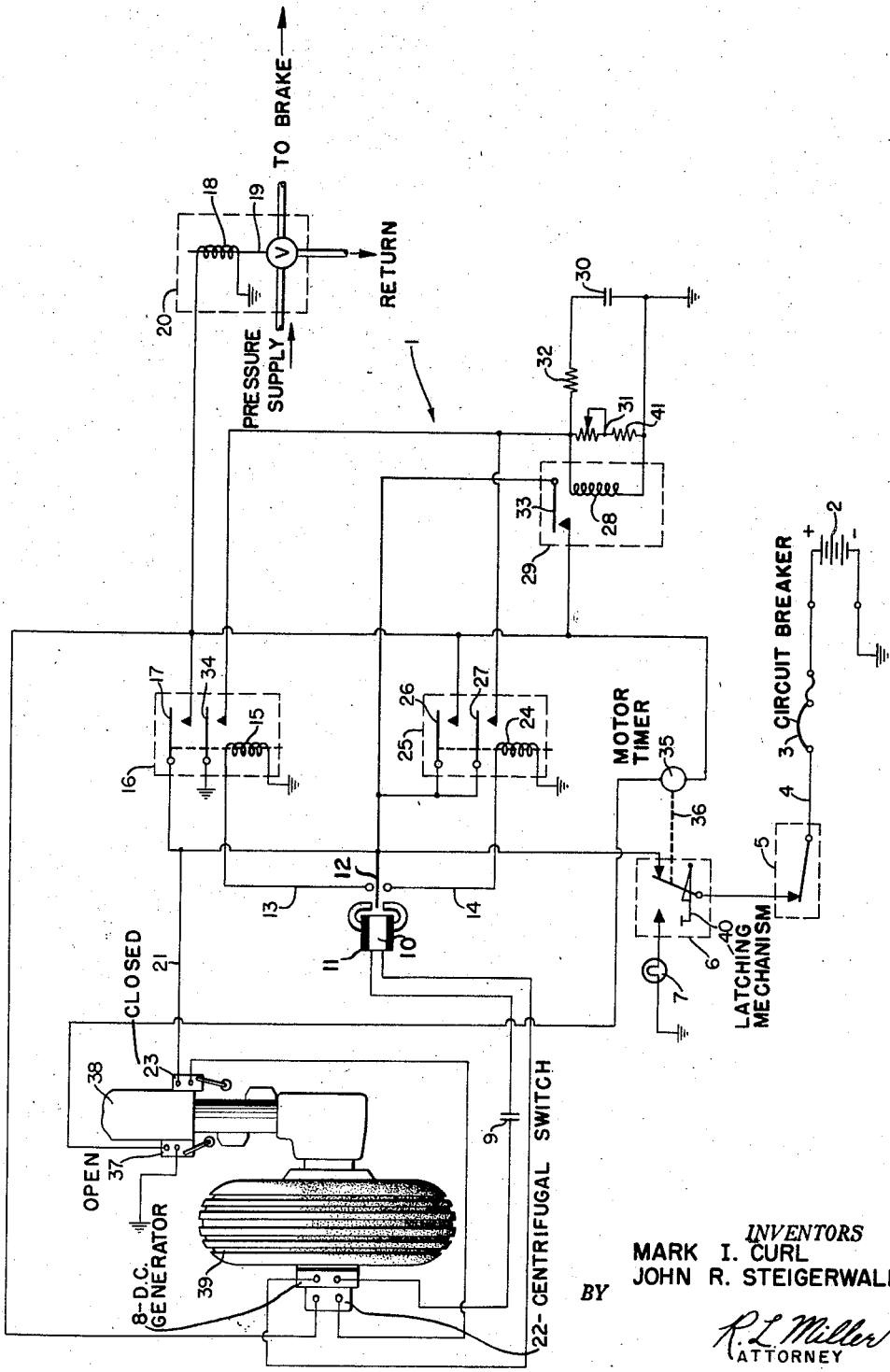

2,850,121

ELECTRICAL ANTI-SKID MECHANISM FOR BRAKES

Mark I. Curl, Cuyahoga Falls, and John R. Steigerwald, Canton, Ohio, assignors to The Goodyear Tire & Rubber Company, Akron, Ohio, a corporation of Ohio Application August 24, 1954, Serial No. 451,812

7 Claims. (Cl. 188—181)

This invention relates to anti-skid control mechanisms for brakes, and especially to electrically actuated mechanisms of the type particularly adapted for use with air-aircraft and more particularly for use during the landing of aircraft when it is highly desirable to prevent overbraking with its consequent tire skidding and loss of braking efficiency.

Various control means and circuits have been provided heretofore for preventing the skidding of braked wheels when predetermined conditions or actions occur and one of such systems is shown and disclosed in Curl et al. patent application Serial No. 248,756, now Patent No. 2,753,017, filed September 28, 1951, by one of the joint inventors hereof. The present control mechanism comprises an improvement on such apparatus.

In control means of the class described, it is very important that means be provided for automatically holding off brake pressure until the wheels spin up to approximately aircraft speed at landing touch-down. If a wheel leaves the runway during the landing roll, brake pressure must again be automatically removed until the wheel again touches down to prevent the wheel being locked when it again contacts the ground. Usually the generation of the sensing or signal means by which the anti-skid action and circuits are controlled is dependent upon the wheels being in operative engagement with the ground.

Another important problem to be considered in anti-skid mechanism and controls is that the anti-skid control means, which serve to remove brake pressure when a wheel is decelerated above a predetermined rate, should have the brake means held off from operative action long enough to permit the wheel being controlled to return to ground speed, but no longer. Like with other automatically operated means, it is important that the pilot can return his braking system to regular and full manual brake control in an instant should any malfunctioning or failure in the anti-skid protection means and control circuit occur.

In order to release the pilot from the responsibility of returning the braking system to full manual control when some failure of the anti-skid occurs there should be automatic means provided to effect such a control action.

It is the general object of the present invention to provide anti-skid control mechanism for braked wheels wherein an anti-skid control circuit means insures proper functioning of the control mechanism under all possible failures or actions in the anti-skid means under landing conditions and to permit disengagement of the automatic anti-skid control means provided, when desired.

A particular object of the invention is to provide control means in the anti-skid mechanism which prevents application of brake pressure until the wheel to be braked has touched the ground and has been accelerated to the aircraft ground speed.

Another object of the present invention is to provide means in the anti-skid control mechanism for preventing a locked wheel condition from occurring as the result of brake pressure being reapplied before the wheel has returned to ground speed.

A further specific object of the invention is to provide an automatic control in the anti-skid mechanism which opens the anti-skid control circuit to render it inoperative should any of the switch or relay means or other elements in the control circuit stick or otherwise become inoperative to hold off brake action longer than a predetermined safe period in the control operation.

Another object of the invention is to provide an anti-skid control circuit for aircraft landing gear wherein the control means are electrically inoperative until the landing gear has been lowered.

A further object of the present invention is to maintain the sensitivity of response of the anti-skid control means with rapid periods of acceleration and deceleration of the aircraft wheel even though safety means are provided in the circuit to retain the brakes inoperative long enough to permit the wheel or wheels being controlled to return to ground speed.

The foregoing and other objects and advantages of the present invention will be made more apparent as the specification proceeds.

A better understanding of the present invention may be had by reference to the accompanying drawing which shows an electric wiring diagram and other diagrammatically illustrated means associated therewith for the anti-skid control mechanism of the invention.

It is contemplated that a conventional oleo strut would be used to position a support wheel and associated brake on the aircraft and a portion on such strut is shown in the drawing. It should be understood that the anti-skid control means can be adapted to operate with any conventional type of braking means.

It will be realized that the control system of the invention can be used, without any major revisions, with other wheels wherein the braking forces to be applied thereto are to be controlled. However the invention is particularly applicable for use with aircraft landing gear wheels and the invention will be so described.

Apparatus such as is referred to in the above-identified pending U. S. patent application is one example of control apparatus with which the control circuit of the invention can readily be used.

The present invention in general relates to a brake anti-skid and control circuit wherein brake means, a wheel, a support strut, a power supply, a normally closed centrifugal switch adapted to be opened at a predetermined speed appreciably below aircraft landing speed, a control switch to be opened when the aircraft support strut is loaded, electric means for preventing operation of the brake means, and means connecting the switches and power supply to the electric means to prevent application of brake pressure until one of the switches is opened, are provided. The control circuit also may include control means for opening the power supply circuit when the brake operation preventing means are energized longer than for a predetermined interval, while other means may be present in the control circuit for preventing operation of such control means until the support strut has been operatively positioned. Further control means are normally present in the circuit to retain the brake means inoperative until the wheel being controlled can return to ground speed.

In order to understand the present invention in detail, reference should be had to the details of the control circuit shown in the accompanying drawing, and the numeral 1 is used to refer to the electrical anti-skid control system and mechanism of the invention as a whole.

A conventional power supply for the electrical anti-skid mechanism of the invention is shown by the battery 2 and this battery 2 connects through a conventional circuit breaker 3 positioned for easy reach by the pilot or other person in control of the mechanism 1 for rendering the circuit inoperative by disconnecting the power supply therefrom. Power is supplied to the general control circuit of the invention by a power supply lead 4 in which a control switch 5 is positioned. This control switch 5 is positioned in the aircraft or other carrier member and is only closed when the aircraft landing gear would be moved to an operative position. A two-position switch 6, the operation of which will be hereinafter described in more detail, is also connected in the power supply lead 4. The switch 6 in the position shown will transmit power to the remainder of the control circuit, and in its other position will transmit power to an indicator light 7 to indicate that some improper condition exists in the anti-skid control circuit and mechanism 1 and that the anti-skid system is inoperative, all as explained hereinafter in detail.

Power for controlling the electrical anti-skid control mechanism 1 of the invention is basically provided by a conventional D. C. generator 8 suitably associated with and driven by the braked wheel with which the apparatus is to be used so that such generator 8 is driven at a speed proportional to the rotating speed of the wheel. Energy supplied from the generator 8, as long as the speed of such generator is increasing, will flow to a condenser 9 and through an operating coil 10 of a neutral position, polarized relay 11 used in the control circuit as one important element thereof. It will be seen that current will only flow through this circuit connecting the condenser 9, coil 10 and generator 8 when the generator is either accelerating or decelerating and when such acceleration or deceleration rate is of a sufficient predetermined amount that a current of required strength will flow in the coil 10, such coil 10 will cause the relay 11 to be actuated for temporarily closing the circuit from the power supply lead 4 through a relay controlled switch, or contact 12 to either a lead 13 or a lead 14, as hereinafter described in more detail.

Thus should the generator 8 be accelerating over the predetermined rate, the relay 11 will close switch 12 to contact lead 13, which lead 13 connects to an operating coil 15 of a first normally open control relay 16. This control relay controls a switch or contact 17 that connects the power supply lead 4 to an operating coil 18 of a plunger 19 which is directly connected to a member, such as a solenoid valve 20, located in a hydraulic pressure brake operating circuit for the removal of braking pressure when the plunger 19 is energized. Hence, when the aircraft wheel is accelerating, as during the initial landing conditions, the plunger 19 is energized and no braking action may occur.

It is also very important that the application of brake pressure be prevented prior to the aircraft landing wheel actually being on the ground and in contact therewith to prevent the braked wheel from being locked in a fixed position when it first contacts the ground. Hence the power supply lead 4 also connects to a lead 21 in which a suitable centrifugal switch 22 is provided directly associated with or connected to and driven by the aircraft wheel and closed when no rotative energy is supplied thereto. However, when rotated at a speed above a predetermined amount, such as about ten miles per hour, which speed is appreciably below the normal landing speed for any aircraft, the switch 22 will open. A further switch 23 is positioned on the aircraft landing gear strut and is normally closed, being open only when a load has been applied to the landing gear strut and when a conventional oleo strut, for example, would have been partially telescoped into a load carrying position by relative movement of portions of the landing gear strut. Such relative movement would be used for opening the control switch 23. The attached drawing clearly shows that the lead 21 connects through the normally closed switches 22 and 23 to the operating coil 18 of the plunger 19 so that power will be transmitted to such solenoid operating coil at all times when the wheel unit is not rotating above a predetermined speed and no switch operative load is present upon the aircraft landing strut. This prevents braking action from existing or being applied prior to touch-down of the aircraft wheels. Also, if the wheel bounces off the ground and while brake pressure is applied, the switch 22 will close after the wheel drops below 10 M. P. H. thereby releasing braking action.

Anti-skid operation after wheel touch-down

As indicated, the control relay 11 will cause removal of possible braking action during acceleration above a predetermined rate of the generator 8 and after the switches 22 and 23 are opened. After such generator and the wheel associated therewith have reached ground speed, then a constant D. C. voltage would be provided by the generator and no current will flow through the operating coil 10 so that the relay 11 will take its neutral position and break the circuit to the energization coil 15 of the control relay 16 so that the plunger 19 will become de-energized and braking action can be applied by the pilot. Now let it be presumed that the pilot has applied too much braking energy to the aircraft wheel and a too rapid deceleration of such wheel starts to occur. At such time, the generator 8 will then appreciably reduce its output and electrical power stored in the condenser 9 will flow through the operating coil 10 of the relay 11 in an opposite direction to the charging current. This will cause the polarized control relay 11 to close the switch 12 on lead, or contact 14 which supplies power to an operating coil 24 of a second normally open control relay 25. When energized, this second control relay 25 closes a control switch or contact 26 connecting power supply lead 4 to the operating coil 18 of the plunger 19 and effectively removes braking action. Removal of the braking pressure presumably will permit the braked wheel to resume its aproach towards the aircraft speed by rapid acceleration of the wheel speed, and, when such acceleration occurs, the control relay 11 would be actuated through its coil 10 to close switch 12 into contact with lead 13 and prevent any braking action until the wheel has reached aircraft speed and no further acceleration thereof occurs.

Locked wheel prevention controls

The second control relay 25 has a second control switch or contact 27 connected thereto and controlled thereby. This control switch 27 when closed energizes an operating coil 28 of a normally open relay 29 which has a slow release circuit means connected thereto for operation when too rapid deceleration of the wheel occurs. This slow release circuit means comprises a condenser 30 connected in circuit with the operating coil 28, a resistance 31 connected in parallel with such operating coil 28, and a resistance 32 connected in series with the condenser 30. The closing of control switch 27 charges the condenser 30. Upon opening switch 27 this charging means is removed and current will slowly leak from such condenser 30 through the operating coil 28 to maintain such relay 29 and a relay controlled switch 33 closed for a predetermined period, such as approximately two seconds. It will be seen that the control switch 33 connects the power supply lead 4 to the operating coil 18 of the plunger 19 and maintains the braking means inoperative for the period of actuation of the control relay 29. Variation in the values of the resistance 31 provided in the control circuit for the relay permit adjustment of the time delay during which the relay 29 is maintained in its closed position.

The drawing also shows that a further control switch 34 is connected to the first control relay 16 and is closed when such relay is energized. The switch 34 connects the condenser 30 to the ground and effects a rapid, instantaneous discharge of such condenser through the relatively low value resistance 32 when the wheel with which the control apparatus of the invention is associated starts to accelerate at usual rates encountered and the first control relay 16 is closed. Hence the slow opening action of the relay 29 is effectively terminated to permit rapid response of the control means of the invention to operating conditions in the braked wheel, when such wheel is properly returning to the aircraft ground speed.

*Fail-safe means*

Another important feature of the invention resides in the fact that should any electrical current carrying element of the invention for some reason fail to release properly, or switch means or relays of the invention remain closed longer than they should for correct control operation of the control system or circuit 1, means are provided for rendering the control system inoperative should such continued energization of a portion of the circuit occur. The means provided for such action comprise a motor timer 35 connected to the power supply line through one of the switches 17 or 26 connected to the control relays 16 and 25, respectively, and to the switch 33, as well as through the centrifugal switch 22 and the control switch 23. Energization of the motor timer 35 affects movement of a control arm 36 extending therefrom, with the extent of movement of the control arm being dependent upon the length of actuation of such motor timer. This motor timer is of a conventional construction and is of a type shown in U. S. Patent No. 2,513,410 wherein the control arm 36 automatically returns to a neutral or starting position at the end of each actuation of the motor timer member. The apparatus is so constructed and arranged that the normal period of energization of the motor timer 35, as when the first control relay 16 is instantaneously closed, or when the delayed release type of the relay 29 is energized and held closed for two seconds, will not permit operative movement of the control arm 36. Such control arm 36 is adapted to actuate the two-position control switch 6 to move such switch from its operative position as shown over to its opposite position when the light 7 is energized to show improper functioning of the control system 1 and to disconnect the control system from the brake circuit.

Yet a further control switch 37 also is connected in the energization circuit for the motor timer 35. Such control switch 37 is connected to and carried by the support strut for the aircraft in a suitable manner so that such switch is closed only after the wheels have touched down. Hence the motor timer 35 and associated means cannot be brought into action by the touch-down control means, such as the centrifugal switch 22 and the strut operating switch 23 which energize the operating coil 18 of control plunger 19 until after landing conditions are established. One suitable length of time of actuation for the motor timer 35 required to operate switch 6 would be 3.5 seconds so that if any portion of the circuit remained energized for such a length of time, then the motor timer unit would operate to disconnect the entire control system and manual operation of the brakes would be restored.

A support strut 38 is diagrammatically shown in the drawings and has the switches 23 and 37 suitably secured thereto. The strut 38 journals a wheel 39 thereon and the centrifugal switch 22 is operatively associated with and driven by the wheel 39. The control system 1, of course, functions to prevent skidding of this wheel 39 by the brake means provided therefor.

A suitable latching mechanism 40 is provided to hold the control switch in a position to maintain the anti-skid control 1 inoperative until the control switch is manually reset.

A limiter resistance 41 is connected in series as a protector resistor for the resistance 31.

It will be realized that the control system 1 responds very rapidly, for example, in a few hundredths of a second, to changes in speed of the braked wheel being controlled by the means of the invention.

In this specification, the ground speed of a braked wheel is a substantially uniform but usually changing rotational speed less than the aircraft speed due to slip of the wheel relative to the ground. When referring to too rapid a deceleration such as would actuate the second control relay 25, it means that the brake has produced more slip of the wheel 39 relative to the ground than is desired for efficient brake action, such as when a wheel moves towards a locked condition.

In view of the foregoing, it is contended that a relatively uncomplicated circuit and control system have been provided by the invention and that they operate automatically to effect anti-skid control operation on braked wheels, and particularly upon aircraft wheels carried by a conventional aircraft landing gear or struts. It should also be noted that various portions of the circuit can be removed, if desired, if the control action provided thereby is not required in a control system. Thus if the fail-safe portion of the circuit, such as the motor timer 35, switch 6 and associated means, is not deemed necessary in the circuit, they could all be removed. It also should be noted that if no safeguard is thought to be necessary in the circuit to prevent wheel locking action, then the control relay 29, the condenser 30 and associated means could be removed from the circuit which would even permit further simplification of the circuit in that one of the control relays 16 or 25 could be eliminated. In other words, it is a matter of the weight and cost of the control circuit and associated means that would determine in each instance whether all of the control means shown would be used or whether some portions thereof might be separated from the remainder of the circuit and discarded in particular installations. In all event, an automatically functioning, effective type of an anti-skid control has been provided, which control is sensitive to various operating conditions in a braked wheel but which system will detect any malfunctioning of components of the anti-skid system and provide the desired anti-skid control insofar as possible. Hence the objects of the invention are submitted to be achieved.

While a certain representative embodiment and details have been shown for the purpose of illustrating the invention, it will be apparent to those skilled in this art that various changes and modifications may be made without departing from the spirit or scope of the invention.

We claim:

1. In anti-skid apparatus, a wheel, brake means for said wheel, electrically operated control means operatively associated with said brake means for preventing operation of said brake means, a neutral position polarized relay, a source of direct current electrical energy operatively connected to said wheel and connected to said relay for flow of current therethrough in one direction when said wheel is accelerating above a predetermined rate and in the opposite direction when said wheel is decelerating above a predetermined rate, a normally open control relay connected to said polarized relay and closed thereby only when said wheel is accelerating, and a second normally open control relay connected to said polarized relay to be closed thereby only when said wheel is decelerating, both of said control relays being connected to said control means to operate it and prevent brake operation when either of said control relays is closed.

2. In anti-skid apparatus, a wheel, brake means for said wheel, electrically operated control means operatively associated with said brake means for preventing operation of said brake means; a neutral-position, polarized, relay means, a source of direct current electrical energy connected to said relay means and controlled by said wheel for flow of current through the relay in one direction when said wheel is accelerating above a predetermined rate and in the opposite direction when said wheel is decelerating above a predetermined rate, a first normally open control relay connected to said relay means and closed thereby when said wheel is accelerating above a predetermined rate, a second normally open control relay connected to said relay means and closed thereby when said wheel is decelerating above a predetermined rate, both of said first and second control relays being operatively connected to said control means to operate said conitrol means and prevent brake operation when either of said first and second control relays is closed, slow release means including a relay and a condenser actuated and charged by said second control relay and connected to said control means for retaining said brake means inoperative for a predetermined period, and a switch on said first control relay for rendering said slow release means inoperative should said wheel start to accelerate above a given rate during the predetermined period of slow release thereof.

3. In anti-skid apparatus, a wheel, brake means for said wheel, electrically operated control means operatively associated with said brake means for preventing operation of said brake means, a neutral position polarized relay, a source of direct current electrical energy operatively connected to said wheel to be controlled by the rotational speed thereof and connected to said relay for flow of current therethrough in one direction when said wheel is accelerating above a predetermined rate and in the opposite direction when said wheel is decelerating above a predetermined rate, a first normally open control relay connected to said polarized relay and closed thereby when said wheel is accelerating above the predetermined rate, a second normally open control relay connected to said polarized relay to be closed thereby when said wheel is decelerating above the predetermined rate, said first and second control relays being connected to said control means to operate it and prevent brake operation when said first and second control relays are closed, slow release means actuated by said second control relay and connected to said control means for retaining said brake means inoperative for a predetermined period, and a switch on said first control relay for rendering said slow release means inoperative should said wheel accelerate above the predetermined rate during the predetermined period of slow release of said slow release means.

4. In anti-skid apparatus, a wheel, brake means for said wheel, electrically operated control means for preventing operation of said brake means connected thereto, a neutral position polarized relay, a source of direct current electrical energy operatively connected to said wheel to be controlled by the rotational speed thereof and connected to said relay for flow of current therethrough in one direction when said wheel is accelerating above a predetermined rate and in the opposite direction when said wheel is decelerating above a predetermined rate, a control relay connected to said polarized relay and closed thereby when said wheel is accelerating above the predetermined rate, a second control relay connected to said polarized relay to be closed thereby when said wheel is decelerating above the predetermined rate, both of said control relays being connected to said control means to operate it and prevent brake operation when either of said control relays is closed, and a timer connected to said control relays and connected to said control means for rendering said control means inoperative should said control relays be closed longer than a predetermined interval.

5. An anti-skid and control for an aircraft brake comprising a braked wheel, a support strut for the wheel, electrically actuated valve means for releasing pressure fluid from the braked wheel when actuated, electric power means for actuating the valve means, sensing means including a pair of control relays for connecting the power means to the valve means upon too rapid acceleration or deceleration of the wheel, timer control means connectable to said electric power means by either of said control relays for latching the power means in disconnected position if the valve means are actuated longer than a predetermined interval, and indicator means for showing the control circuit inoperative upon the latching of the power means in disconnected position.

6. An anti-skid control for an aircraft brake comprising a braked wheel, electrically actuated valve means for releasing pressure fluid from the braked wheel when actuated, electric power means for actuating the valve means, sensing means for determining too rapid acceleration or deceleration of the wheel, a first control relay closed by the sensing means to connect the power means to the valve means upon too rapid acceleration of the wheel, a second control relay closed by the sensing means to connect the power means to the valve means upon too rapid deceleration of the wheel, slow release means actuated by the second control relay for retaining the electric power means connected to the valve means for a predetermined period, and a switch means forming a part of the first control relay for rendering the slow release means inoperative should the wheel accelerate too rapidly during the predetermined period of slow release.

7. An anti-skid control for an aircraft brake comprising a braked wheel, electrically actuated valve means for releasing pressure fluid from the braked wheel when actuated, electric power means for actuating the valve means, sensing means for determining too rapid acceleration or deceleration of the wheel, a first control relay closed by the sensing means to connect the power means to the valve means upon too rapid acceleration of the wheel, a second control relay closed by the sensing means to connect the power means to the valve means upon too rapid deceleration of the wheel, and slow release means actuated by the second control relay for retaining the electric power means connected to the valve means for a predetermined period upon actuation of said second control relay.

References Cited in the file of this patent

UNITED STATES PATENTS

| | | |
|---|---|---|
| 1,514,247 | Beall | Nov. 4, 1924 |
| 1,766,078 | Kellner | June 24, 1930 |
| 2,256,287 | McCune | Sept. 16, 1941 |
| 2,529,985 | Williams | Nov. 14, 1950 |
| 2,663,521 | Yarber | Dec. 22 1953 |
| 2,744,699 | Lucien | May 8, 1956 |